US009042041B2

(12) United States Patent
Scordino

(10) Patent No.: US 9,042,041 B2
(45) Date of Patent: May 26, 2015

(54) OPTOELECTRONIC MODULE AND LIGHTING DEVICE INCLUDING THE OPTOELECTRONIC MODULE

(75) Inventor: Alessandro Scordino, Mestre (IT)

(73) Assignee: Osram GmbH, Munich (DE)

( * ) Notice: Subject to any disclaimer, the term of this patent is extended or adjusted under 35 U.S.C. 154(b) by 981 days.

(21) Appl. No.: 11/798,558

(22) Filed: May 15, 2007

(65) Prior Publication Data

US 2007/0268696 A1 Nov. 22, 2007

(30) Foreign Application Priority Data

May 19, 2006 (EP) .................................... 06425336

(51) Int. Cl.

| | |
|---|---|
| ***G02B 7/02*** | (2006.01) |
| ***G02B 27/14*** | (2006.01) |
| ***F21V 13/00*** | (2006.01) |
| ***F21K 99/00*** | (2010.01) |
| *F21Y 101/02* | (2006.01) |
| *F21V 7/00* | (2006.01) |

(52) U.S. Cl.

CPC ... *F21K 9/00* (2013.01); *F21K 9/54* (2013.01); *F21Y 2101/02* (2013.01); *F21V 7/0008* (2013.01)

(58) Field of Classification Search

USPC ................. 359/808, 811, 813, 814, 819, 815, 359/201.2, 208.1, 208.2, 484.04, 514, 584, 359/631, 633; 362/23.14, 609, 514, 516, 362/517, 217.05, 243, 245, 247, 241, 362/296.01, 341

See application file for complete search history.

(56) References Cited

U.S. PATENT DOCUMENTS

| | | | | |
|---|---|---|---|---|
| 6,149,283 | A | 11/2000 | Conway | |
| 6,841,804 | B1 | 1/2005 | Chen et al. | |
| 7,151,599 | B2 * | 12/2006 | Islam et al. | 356/301 |
| 7,447,891 | B2 * | 11/2008 | Faase et al. | 713/1 |
| 7,540,629 | B2 * | 6/2009 | Steinberg | 362/234 |
| 7,923,706 | B2 * | 4/2011 | Brassell et al. | 250/504 R |
| 2005/0135113 | A1 | 6/2005 | Wang et al. | |
| 2005/0157503 | A1 * | 7/2005 | Lin | 362/327 |
| 2006/0061894 | A1 * | 3/2006 | Li | 359/858 |

FOREIGN PATENT DOCUMENTS

| | | |
|---|---|---|
| DE | 101 64 033 | 7/2003 |
| DE | 10 2004 013226 | 9/2005 |
| JP | 2001 243821 | 9/2001 |
| JP | 2003-008067 | 1/2003 |
| WO | WO 02/084749 | 10/2002 |
| WO | WO 2004/088200 | 10/2004 |
| WO | WO 2006/033032 | 3/2006 |

* cited by examiner

*Primary Examiner* — Scott J Sugarman
*Assistant Examiner* — Brandi Thomas

(57) ABSTRACT

An optoelectronic module 1 having at least a first 2A and a second 2B radiation-emitting source and a first optical element 5 including a cavity 10 wherein the surface 5A of the cavity 10 is able to reflect the radiation 3A, 3B of the at least two radiation sources. An outlet 15 in the optical element 5 is provided for coupling radiation out of the cavity 10, wherein the radiation emitted by the radiation sources 2A, 2B is reflected by the surface 5A of the cavity resulting in a mixing of the radiation.

32 Claims, 8 Drawing Sheets

OPTOELECTRONIC MODULE AND LIGHTING DEVICE INCLUDING THE OPTOELECTRONIC MODULE

The invention relates to the mixing of radiation emitted by different radiation-emitting sources.

It is the main object of one embodiment of the invention to provide an optoelectronic module with different radiation sources enabling a mixing of the radiation of the different radiation-emitting sources. One embodiment of the present invention meets this need by providing an optoelectronic module according to base claim 1. Further embodiments of the invention are subject of further dependent and independent claims.

One embodiment of the invention describes an optoelectronic module comprising:

- at least a first and a second radiation-emitting source,
- a first optical element including a cavity, the surface of the cavity able to reflect the radiation of the at least two radiation sources, and
- an outlet in the optical element for coupling radiation out of the cavity,
- wherein the radiation emitted by the radiation sources is reflected by the surface of the cavity and the reflected radiation is outcoupled through the outlet, resulting in a mixing of the radiation from the first and second radiation-emitting source a second optical element arranged outside the cavity on or around the outlet, wherein the radiation emitted by the radiation sources is reflected by the surface of the cavity and the reflected radiation is out-coupled through the outlet, resulting in a mixing of the radiation from the first and second radiation emitting source, characterized in that the second optical element (20) comprises a reflector.

The surface of the cavity reflecting the radiation of the first and second different radiation-emitting sources enables an improved mixing of the radiation, thereby resulting in a more homogenous radiation output through the outlet of the first optical element. Therefore such an optoelectronic module produces a more homogenous radiation output distribution than other optoelectronic modules which do not have such a cavity with a reflecting surface.

In the case that the first and second radiation-emitting sources are spatially separated from one another such a mixing of the radiation can lead to a spreading of the radiation sources over a larger area thereby providing a radiation output reducing or even completely compensating the spatial separation of the radiation sources.

It is not necessary that the complete surface of the cavity is able to reflect the radiation. For example, in the case that the first and second radiation-emitting sources have a preferred direction of emission of the radiation, only the parts of the surface of the cavity which are arranged in this preferred direction have to be reflective for the radiation. Preferably more than 90%, even more preferably more than 95% of the surface of the cavity should be reflective for the radiation.

The term "radiation-emitting source" denotes any kind of radiation source which is able to emit radiation. For example optoelectronic devices which can emit radiation when a voltage is applied can be considered as radiation-emitting sources. This term also covers, for example, fluorescent or phosphorescent materials for example radiation conversion materials, which are able to emit secondary radiation when absorbing a primary radiation for example from an optoelectronic device. This secondary radiation can have a longer wavelength than the primary radiation.

The optoelectronic module further comprises a second optical element arranged outside the cavity on or around the outlet.

Such a second optical element is advantageously able to modulate the mixed radiation outcoupled via the outlet.

According to the invention, the second optical element comprises a reflector which can for example focus the mixed radiation beam angle thereby providing a high radiation intensity in the forward direction.

In another embodiment of the invention the first radiation-emitting source is able to emit radiation at a wavelength different to the wavelength of the second radiation-emitting source.

In such a case the mixed radiation outcoupled via the outlet would have a wavelength which is a mixture of both radiations. For example in the case that visible radiation is emitted by both radiation-emitting sources an effective color mixing can take place in such an optoelectronic module.

In accordance with another embodiment of the invention the first and second radiation sources are a first and second optoelectronic device. Such an optoelectronic device can be for example, an inorganic semiconductor chip, for example a light-emitting diode (LED). The optoelectronic devices also can be organic light-emitting diodes (OLEDs), which in general comprise a first and a second electrode and at least one organic functional semiconducting layer disposed between both electrodes. In the case that a voltage is applied via the first and second electrode, electrons and "holes" are injected into the organic functional layer resulting in an emission of radiation upon recombination of the electrons and the "holes". The optoelectronic devices can comprise a certain encapsulation for example epoxy including optical elements (for example lenses, diffusers or reflectors), which can influence the spatial distribution of the emitted radiation of the optoelectronic devices.

It is also possible that according to another embodiment of the invention the first radiation source is an optoelectronic device and the second radiation source is a radiation conversion material. Such a radiation conversion material is, for example, able to emit radiation at a second wavelength when stimulated by the radiation of the first radiation source (optoelectronic device). In some cases the radiation emitted by the radiation conversion material has a longer wavelength than the wavelength of the radiation emitted by the optoelectronic device. For example the optoelectronic device can be able to emit blue radiation and the radiation conversion material, for example, phosphorous, can be able to emit yellow radiation when being stimulated by the blue light of the optoelectronic device. In such a case an effective mixing of the blue and yellow light can take place within the cavity of the first optical element of the optoelectronic module, thereby leading to a white light output through the outlet (see for example FIG. 4).

The optoelectronic devices and radiation sources of the optoelectronic module can be arranged within the cavity of the first optical element.

Preferably the radiation conversion material can be included in the surface of the cavity. Such an arrangement of the optoelectronic device and the radiation conversion material can lead to an improved mixing of both radiations due to the fact that parts of the radiation of the optoelectronic device are reflected by the cavities and other parts of the radiation are absorbed by the radiation conversion material.

Furthermore, it is possible that a third radiation source is present apart from the first and second radiation source, wherein the third radiation source is able to emit radiation at a wavelength different to the wavelength of the first and second radiation sources.

In such a case a very effective mixing of the radiations of three different wavelengths can be carried out within the cavity by reflecting and thereby mixing the different radiations. In the case that the first, second and third radiation source emit different primary colors, for example red, green and blue light, white output can be generated after mixing the different colors. It is also possible to use circuitry that drives the three radiation sources independently, so that the intensity of radiation emitted by the different sources can be independently tuned or even separately turned off, thereby enabling a broader spectrum of mixed radiation to be emitted by the optoelectronic module.

In yet another embodiment of the invention the optoelectronic module further comprises a second optical element arranged outside the cavity on or around the outlet.

Such a second optical element is advantageously able to modulate the mixed radiation outcoupled via the outlet. For example the second optical element can comprise a reflector which can focus the mixed radiation outcoupled through the outlet in a very small radiation beam angle thereby providing a high radiation intensity in the forward direction. It is also possible that for example, the second optical element comprises a lens which could also focus the mixed radiation.

The first optical element can furthermore be opaque for the radiation of the radiation sources. For example, the first optical element can comprise metal, plastic or the like. The first optical element can, for example, be a metal cup having a highly reflective surface of the cavity (see embodiments). It is also possible to manufacture the first optical element by forming a cavity in a plastic block.

The first optical element can also comprise a material which is transparent for the radiation of the radiation sources. In such an embodiment of the invention a reflective, opaque material can be applied on the surface of the cavity thereby enabling a good reflection of the radiation.

In yet another embodiment of the invention the optoelectronic devices as radiation sources are arranged within the cavity of the first optical element around the outlet. Such a special arrangement of the optoelectronic devices ensures that a large fraction of the radiation emitted by the optoelectronic devices is first reflected by the surface of the cavity and therefore mixed before leaving the cavity via the outlet (see for example FIGS. 2, 3 and 4).

Preferably the first optical element of the optoelectronic module comprises a housing including the cavity with a concave curved surface. The surface of the cavity can adopt any kind of concaved curved form, for example parabolic, spherical, hemispherical or an ellipsoidal form. A cavity with such a concaved curved surface form, as for example shown in FIGS. 1 and 2, can effectively reflect the radiation and thereby provide a good mixing of the radiation.

In another embodiment of the invention at least parts of the surface of the cavity are able to reflect the radiation of the radiation sources at least two times forming a multiple reflection surface. Such a multiple reflection surface is preferably orientated relative to the outlet in such a way that radiation reflected by the multiple reflection surface cannot travel directly through the outlet but first has to be reflected again. Certain embodiments of multiple reflection surfaces are, for example, shown in FIGS. 2, 3 and 4.

In a further embodiment of the invention the first optical element further comprises a substrate having an opening as the outlet. The substrate with the opening can, for example, easily be arranged in such a way relative to the cavity of the first optical element that a closed cavity is provided for mixing the radiation and housing the radiation sources.

Advantageously the radiation sources are arranged on the substrate around the opening as, for example, shown in FIG. 2 and FIG. 7. The substrate with the radiation sources can then be mounted on the cavity of the first optical element thereby forming a closed cavity harboring the radiation sources. When optoelectronic devices are used as radiation sources the radiation output surfaces of these optoelectronic devices are preferably arranged in such a way so that the radiation output surfaces are facing the reflective surface of the cavity. Such an arrangement provides a good reflection of the radiation emitted by the optoelectronic devices as, for example, shown in FIGS. 2, 3 and 4. Due to the closed cavity and the orientation of the radiation output surfaces of the optoelectronic devices facing the reflective surface of the cavity, the radiation emitted by the optoelectronic devices cannot leave the closed cavity through the opening as the outlet without first being reflected by the reflective surface of the cavity and thereby being mixed with the radiation of the other radiation sources. It is also possible to connect the substrate on which the radiation sources are arranged to the cavity of the housing via a connection member arranged between the substrate and the cavity. Such a connection member can, for example, also comprise a reflecting surface aligning with the reflecting surface of the cavity and thereby forming a larger reflecting surface. The connection member does not necessarily have to comprise a reflecting surface, but can for example also comprise any other non-reflecting material.

In yet another embodiment of the invention the radiation sources comprise radiation output surfaces defining a main direction for emitting the radiation and the cavity has a concave curved surface with a vertex. In this case the radiation output surfaces of the radiation sources are preferably orientated towards the vertex (see for example FIG. 2). Radiation output surfaces for defining a main beam direction of the emitted radiation can for example be implemented in optoelectronic devices as radiation sources by including optical elements in the encapsulation of the optoelectronic devices, for example lenses or reflectors, which modulate the emitted radiation. In such a configuration the emitted radiation can effectively be mixed and focused in the vertex of the cavity, thereby enabling a high output of mixed radiation through the outlet.

In the case that the optoelectronic devices are arranged on the surface of the substrate having an opening, the surface of this substrate is preferably tilted towards the opening. Such an arrangement is, for example, shown in FIG. 2. Due to the tilted surface of the substrate the optoelectronic devices arranged on this surface are also tilted towards the opening of the substrate. Such an arrangement can, for example, provide a better radiation mixing due to the fact that the radiation beam paths of the optoelectronic devices can overlap.

The tilting of the radiation output surfaces of the optoelectronic devices towards the vertex of the cavity can also provide a better outcoupling of the mixed radiation through the opening in the case that the opening is arranged in or near the focal point, where the reflected and mixed radiation is focused (see for example FIG. 2). Then most of the radiation emitted by the optoelectronic devices is reflected and mixed by the vertex of the concaved curved cavity and is therefore focused in or near the focal point of the concave curved cavity for example a parabolic mirror-shaped surface providing a higher radiation output (see for example FIG. 2). The term "in or near" means that the opening is arranged roughly opposite to the vertex of the parabolic mirror near the focal point. The inventor discovered that outcoupling of the mixed radiation out of the cavity is especially improved when the surface of the substrate on which the optoelectronic devices are arranged is tilted by roughly 30° towards the opening as the outlet.

Advantageously the surface area of the substrate on which the optoelectronic devices are arranged is larger than the surface area of that substrate which is directly occupied by the radiation sources as, for example, shown in FIGS. 2, 3 and 4. This means that the additional surface area of the substrate which is free of the optoelectronic devices on the substrate can be made reflective to the radiation emitted by the optoelectronic devices thereby providing an additional reflection surface area. This additional surface reflection area is advantageously orientated relative to the outlet of the cavity, so that radiation reflected by that additional reflection radiation surface area is not directly outcoupled through the outlet, but first has to be reflected by other parts of the reflective surface of the cavity before leaving the cavity via the outlet (multiple reflection surface area).

According to another embodiment of the invention a closed cavity is formed when the substrate on which the optoelectronic devices are arranged is directly mounted on the cavity of the first optical element. A large part of the surface area of the substrate inside the closed cavity which is adjacent to the optoelectronic devices is free of the optoelectronic devices. Such configurations are, for example, shown in FIGS. 2, 3 and 4. These additional surface areas of the substrate which are free of the optoelectronic devices can serve as a multiple reflection surface area thereby improving the mixing of the radiation of the different optoelectronic devices.

In yet another embodiment of the invention the surface of the cavity may also comprise a diffusive material. Such a diffusive material is able to split the rays of the radiation of the different radiation sources into multiple rays, thereby improving the mixing of the radiation, or example to obtain a good white light mixing starting from an array of selected opto-electronic devices with special wavelengths ( red, green, and blue). In the case that a closed cavity is formed by mounting a substrate on which optoelectronic devices are arranged onto the cavity of the first optical element, it is advantageously also possible that the surface of the substrate which is free of the optoelectronic devices also comprises a diffusive material as, for example, shown in FIG. 3. Such a configuration enables a very efficient radiation mixing by reflecting and diffusing the radiation emitted by the optoelectronic devices or other radiation sources, for example radiation conversion materials.

The diffusive material, for example, can comprise a material selected from the group of bariumsulfate and phosphors. Preferably bariumsulfate as a diffusive material is mixed with white paint in order to improve a better adhesion of the reflective material on the surface of the cavity. Preferably the bariumsulfate is mixed with 20 to 25 weight percent of white paint in order to ensure good adhesion. The phosphorous can additionally convert the radiation emitted by the optoelectronic devices into radiation with a longer wavelength, for example visible light. In the case that UV parts of the radiation emitted by the optoelectronic devices are converted to visible light by the phosphors, the radiation efficiency of the optoelectronic module can be improved.

According to another configuration of the invention, the reflecting surface of the cavity can also comprise a faceted surface, which enables a high outcoupling efficiency.

Advantageously the optoelectronic devices and the first optical element are thermally conductive connected, so that the heat produced by the optoelectronic devices can easily be transferred away from the optoelectronic devices via the first optical element. For example in the case that the substrate on which the optoelectronic devices are arranged is also thermally conductive, the heat produced by the optoelectronic devices can be transferred to the metal cup of the first optical element via the substrate.

According to another embodiment of the invention the size of the outlet is variably adjustable, for example by reducing or enlarging the diameter of the opening in the substrate using slits. Such a configuration can be used in order to control the intensity of the radiation outcoupled out of the module through the outlet.

In one embodiment of the invention the surface of the cavity may also comprise phosphors. This kind of phosphor substrate may be arranged over the substrate of the diffusive material or directly in the cavity structure. The effect of this material is used in the fluorescent lamps and in this embodiment the optoelectronic module uses this effect to increase the light extraction from the cavity. In particular the phosphors can convert the UV light to visible light. The increase of the light extraction from the phosphors is related to the spectrum of the sources; i.e. the lower the wavelength of the source (especially UV light), the higher is the effect of the phosphors. The phosphors substrate effect may also increase the CRI (color rendering index) of the white mixed light (starting from optoelectronic R,G,B sources) coming out from the cavity, with respect to CRI of the mixed light without any kind of cavity and phosphor substrate.

The cavity structure with phosphors substrate and secondary lens may also be sealed to provide vacuum ambient (inside the cavity) and to give long life to the phosphor substrate. The optoelectronic module according to some embodiments of the invention can form a separate complex part of a larger electronic arrangement. Such a module can formed a self-contained functional unit which can easily be replaced in its entirety. The optoelectronic module can be used as a head lamp, for example in automotive applications in any kind of vehicle.

In the following some embodiments of the invention will be explained in more details by figures and embodiments. All figures are just simplified schematic representations presented for illustration purposes only.

Figure 3:
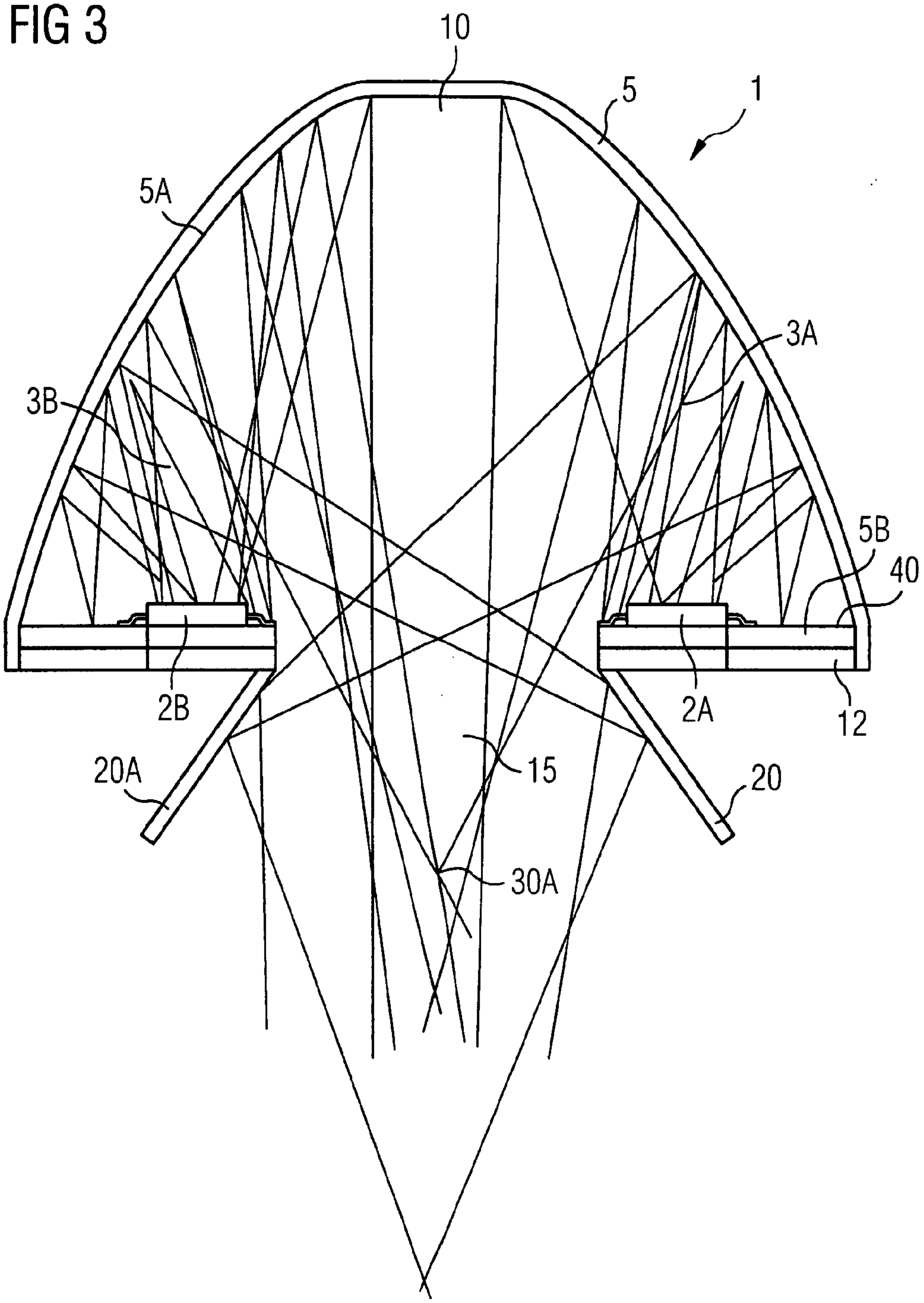
Figure 4:
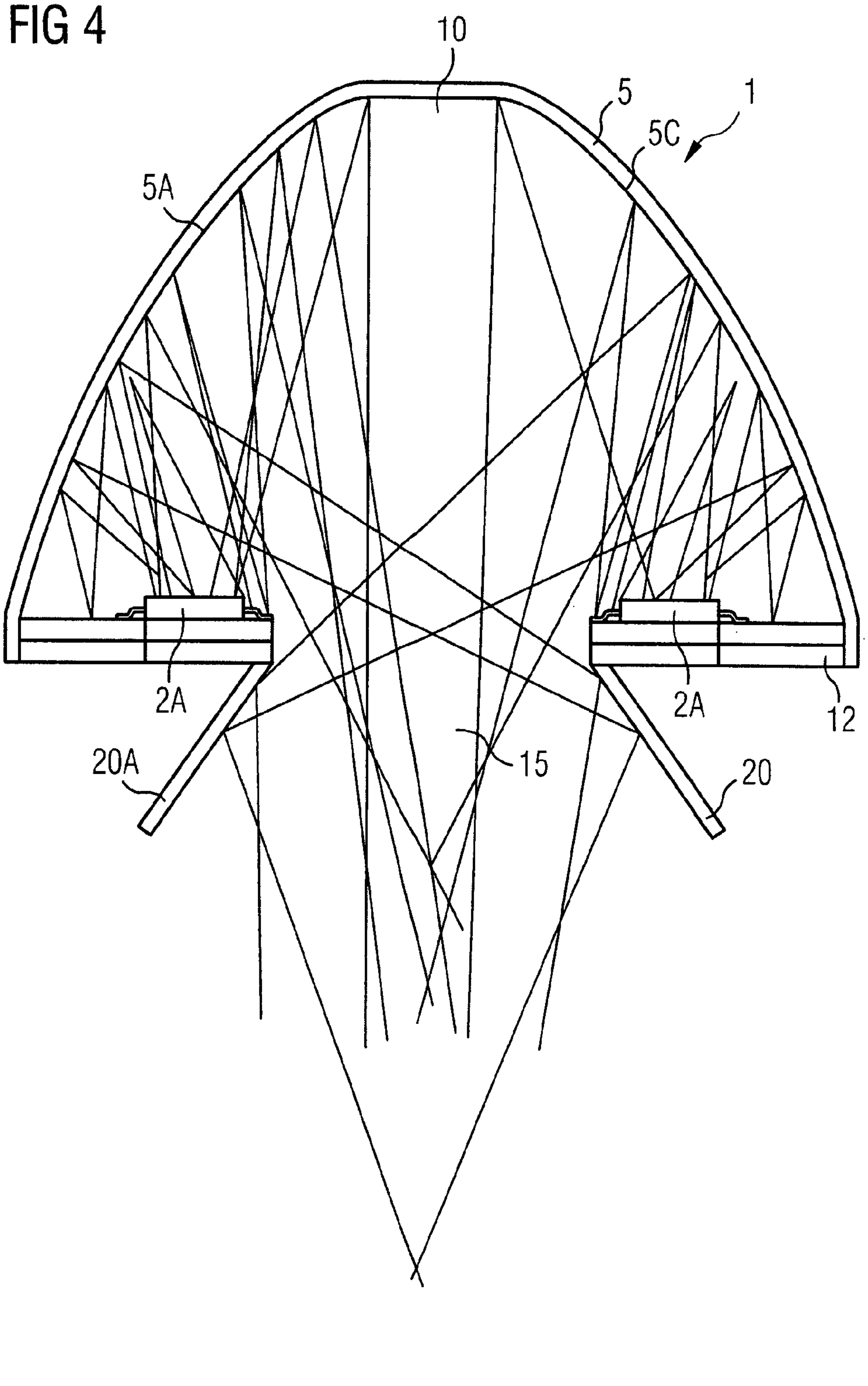

FIGS. 3 and 4 denote different embodiments of the optoelectronic module in cross-sectional view.

Figure 5:
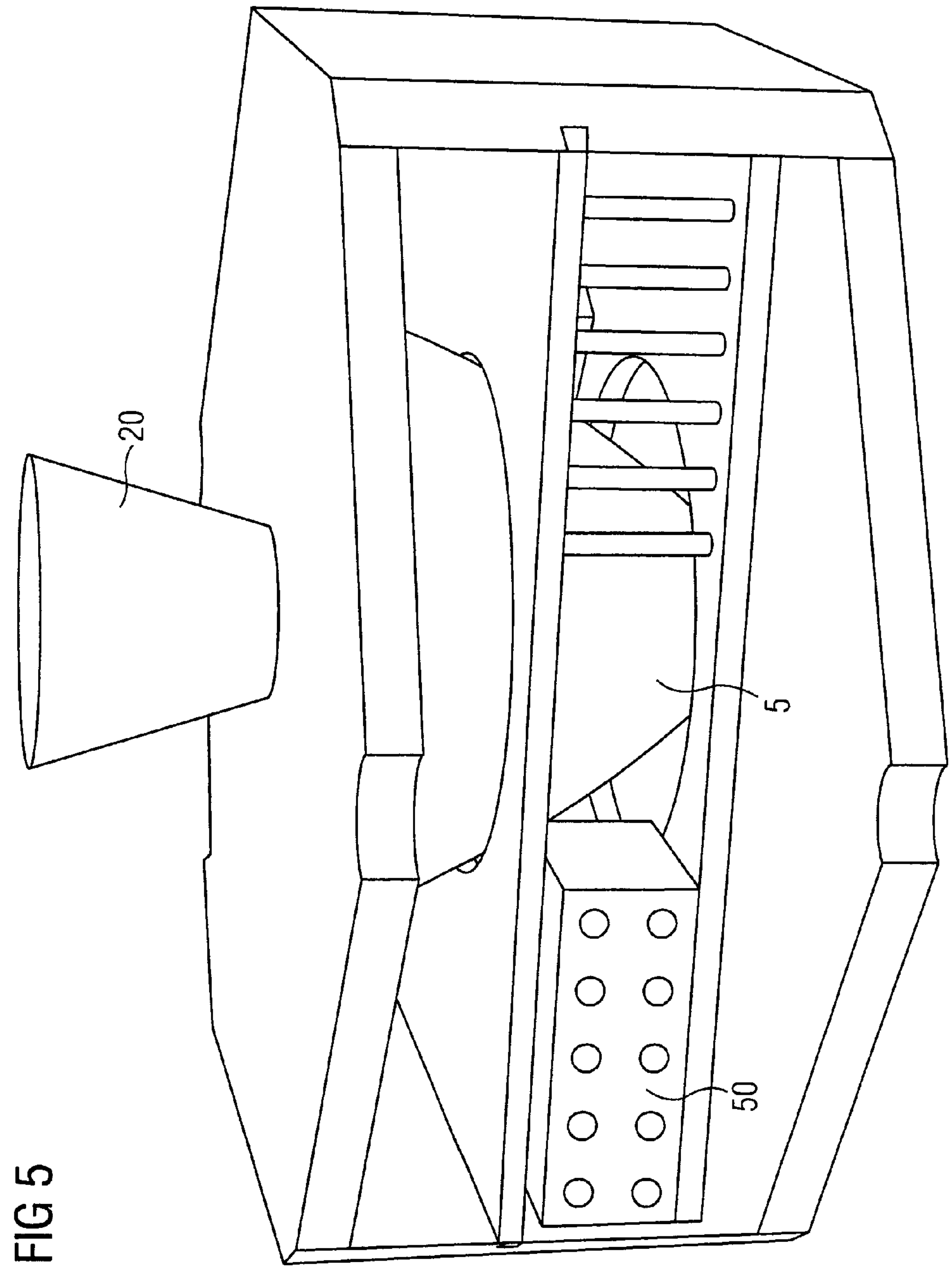
Figure 6:
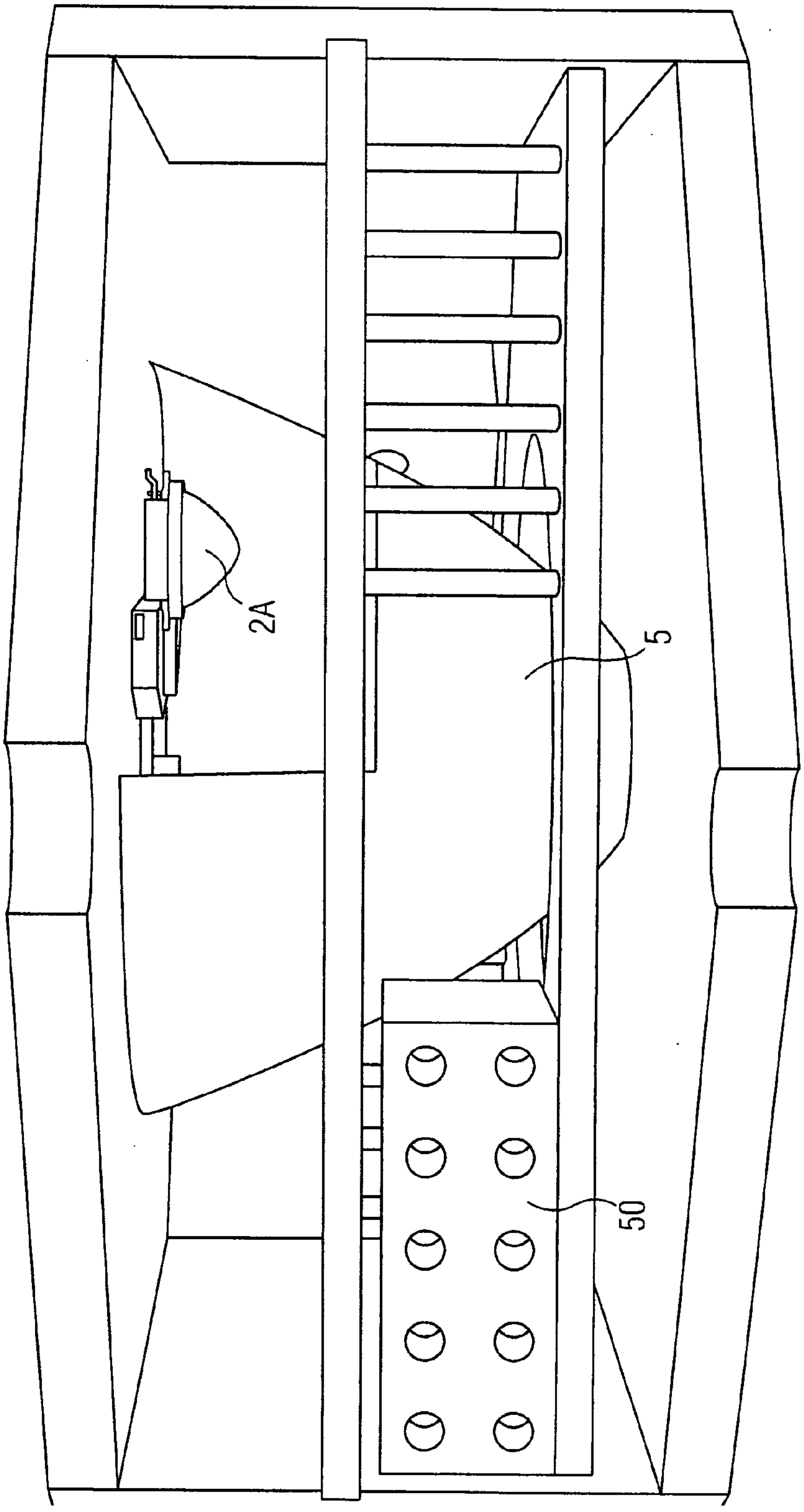

FIGS. 5 and 6 show different optoelectronic modules integrated into larger surfaces.

Figure 7:
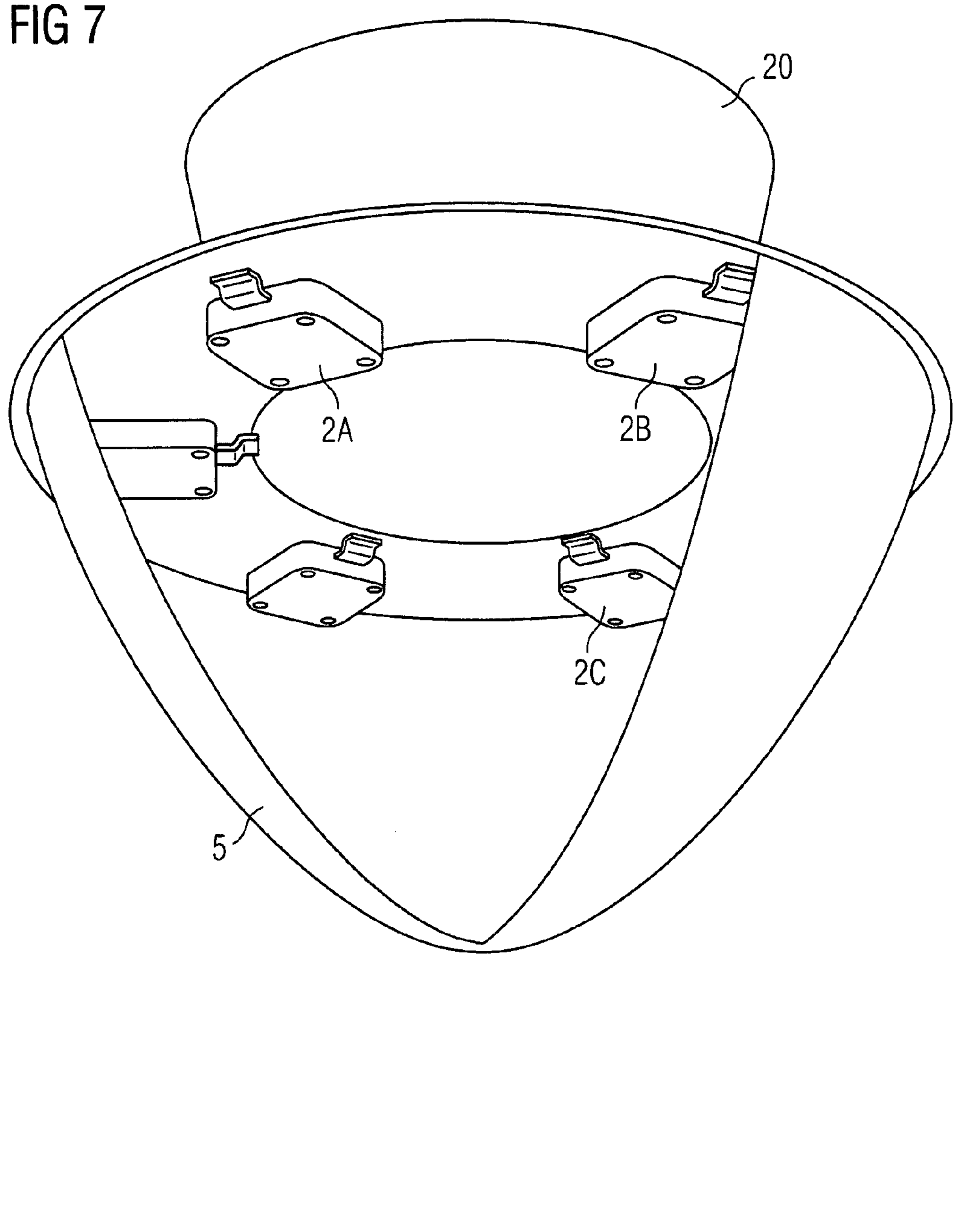

FIG. 7 shows another perspective view of an optoelectronic module in which a section of the reflective mirror of the first optical element is cut out in order to provide insight into the interior of the module.

Figure 1A:
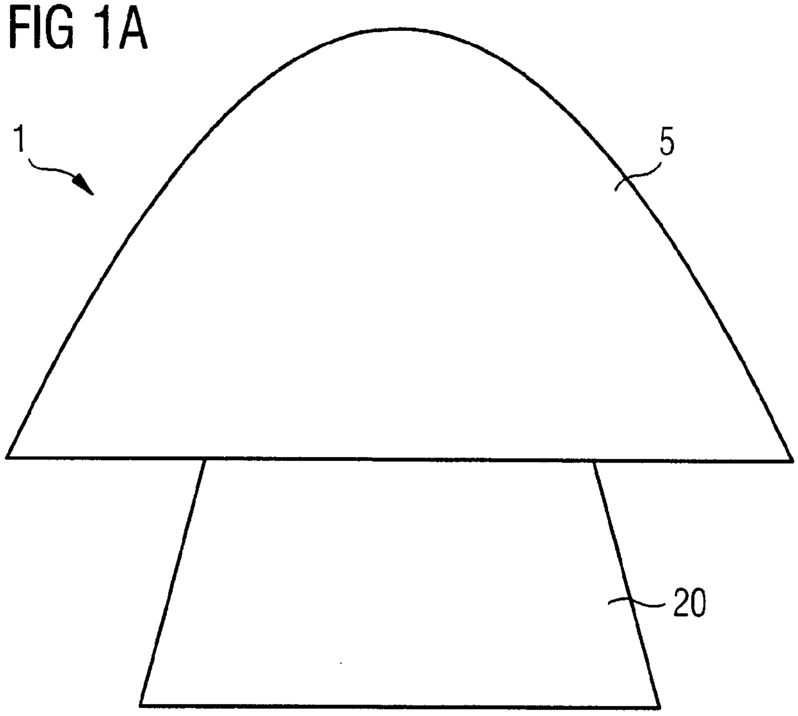
FIGS. 1A to 1C show different embodiments of an optoelectronic module in perspective view.
Figure 1B:
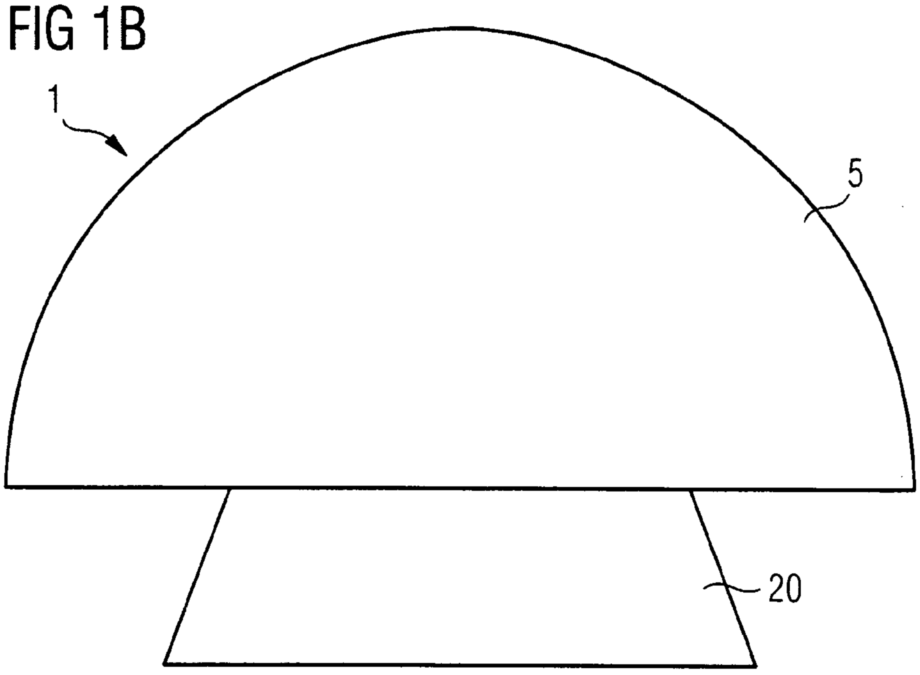
Figure 1C:
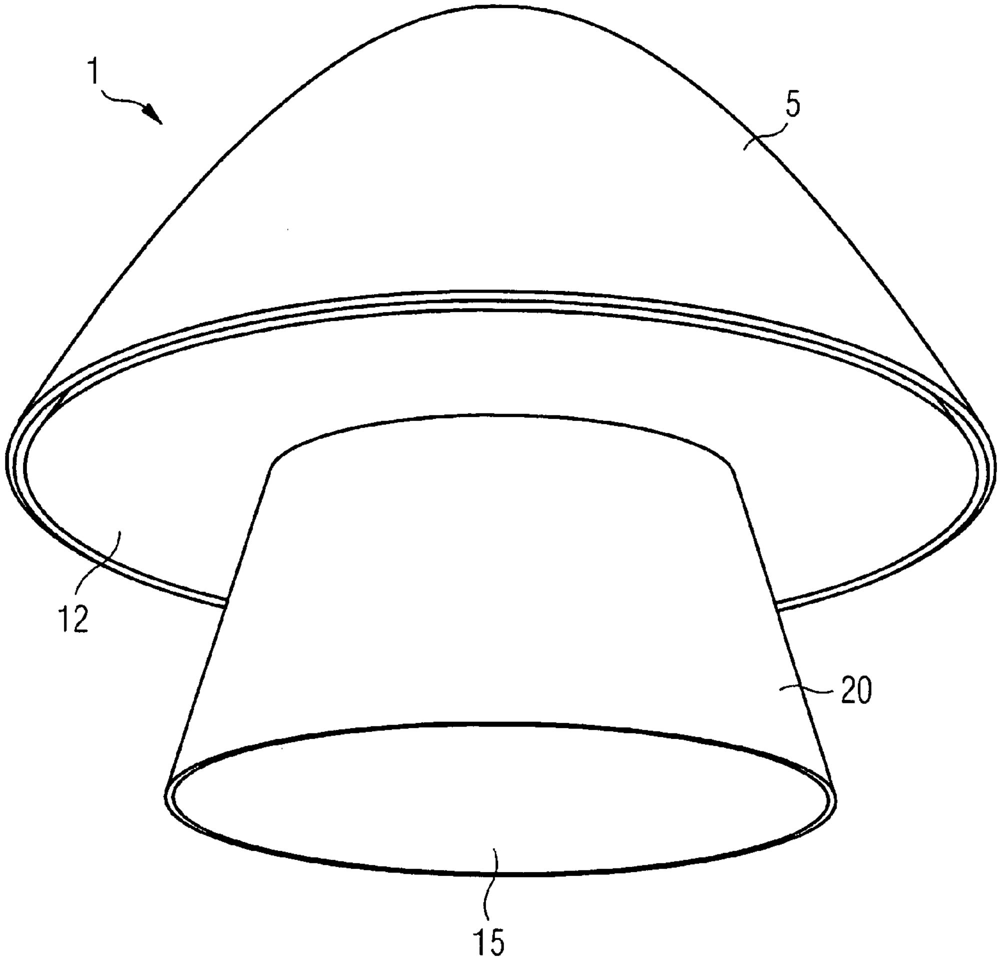

FIG. 1A shows a perspective view of an optoelectronic module 1 from the side. The first optical element 5 comprises a dome-shaped part which can, for example, be made of a metal (metal cup). The second optical element 20 is arranged on the first optical element 5 in the form of a reflective tube which is able to focus the radiation outputted via the outlet 15, which is shown in FIG. 1C. The dome-shaped first optical element 5 can adopt different forms, for example hemispherical forms as shown in FIG. 1B or more parabolic forms as shown in FIG. 1A. FIG. 1C depicts another perspective view of the optoelectronic module where the substrate 12 on which the optoelectronic devices are arranged inside the cavity is shown. The substrate 12 also comprises an outlet 15 wherein around the outlet 15 the second optical element 20 is arranged in the form of a tubular-shaped second reflector focusing the radiation outcoupled via the outlet. The inventor found out that a diameter of the outlet of roughly 27 mm and a radius of roughly 10 mm of the substrate results in a good mixing and outcoupling efficiency.

Figure 2:
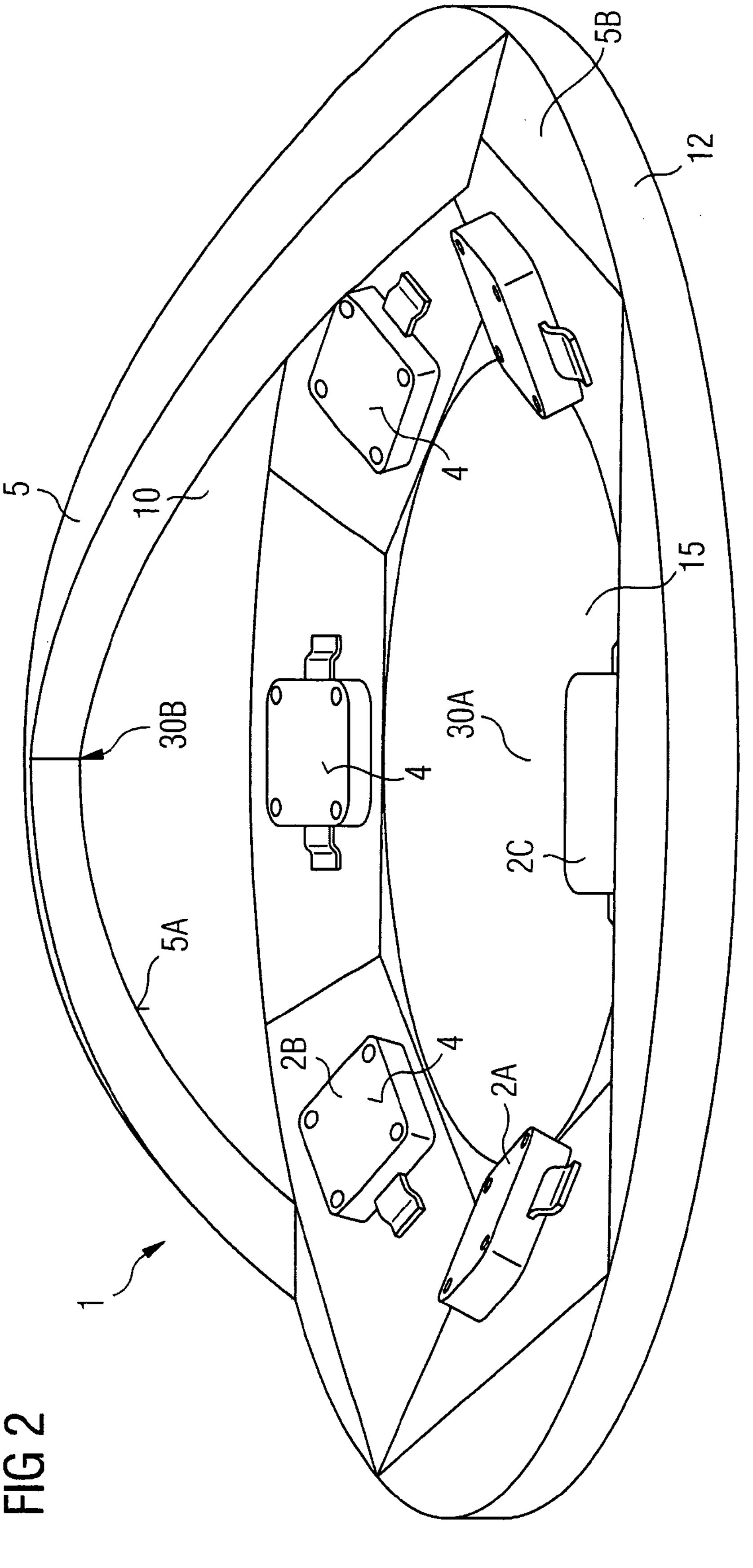
FIG. 2 shows a perspective view of an optoelectronic module with a section cut out of the first optical element.

FIG. 2 shows another perspective view of the optoelectronic module 1 according to one embodiment of the invention wherein a part of the dome-shaped reflector of the first optical element 5 is cut out in order to provide a view into the interior of the device. Furthermore, the second optical element is missing in that figure, but could also be present, for example in the form of a tubular-shaped second reflector as shown in FIG. 1A to 1C or even in the form of a lens. It can be seen that the first optical element 5 forms a concave-shaped parabolic mirror having a reflective inner surface 5A. A substrate 12 on which optoelectronic devices 2A, 2B and 2C are arranged is directly mounted onto the parabolic mirror, thereby forming a closed cavity 10 having an outlet 15. The optoelectronic devices only occupy a small fraction of the surface 12A of the substrate 12. Parts of that surface 12A which are free of the optoelectronic devices 2A to 2C can also comprise a reflective surface thereby forming a multiple reflection surface area 5B which is able to reflect the radiation beams which were already reflected by the reflecting surface 5A of the dome-shaped optical element. It can be seen that the surface 12A of the substrate 12 is tilted towards the outlet 15 so that the radiation output surface areas 4 of the optoelectronic devices 2A to 2C are orientated towards the vertex 30B of the reflective surface 5A of the parabolic mirror of the first optical element 5. In this case more light can be outcoupled through the outlet 15. The reflective surface 5A and/or the reflecting surface 12A which is free of the optoelectronic devices 2A to 2C forming the multiple reflection surface area 5B can additionally comprise a diffusive material, for example white paint mixed with bariumsulfate in order to enhance the radiation mixing.

The parabolic mirror of the first optical element 5 is able to focus the radiation of the optoelectronic devices 2A, 2B, 2C in a focal point 30A. The outlet 15 is preferably arranged in or near the focal point 30B of the concave mirror thereby improving the outcoupling efficiency of the mixed radiation.

The optoelectronic devices implemented in the optoelectronic module can for example be the radiation emitting devices described in the patent application WO 02/084749 A2, which is hereby incorporated by reference in its entirety.

FIG. 3 depicts a cross-sectional schematic view of an optoelectronic module additionally showing the beam paths 3A and 3B of the radiation emitted by the optoelectronic devices 2A and 2B. It can be seen that the radiation 3A, 3B emitted by the optoelectronic devices 2A and 2B can be reflected by the reflecting surface 5A of the parabolic mirror 5 of the first optical element in the cavity 10 before leaving the cavity 10 through the outlet 15. A multiple reflection surface area 5B is present on the substrate 12 on which the optoelectronic devices 2A and 2B are mounted, which is able to reflect radiation beams multiple times before they are coupled out of the cavity 10 through the outlet 15. The second optical element 20 again has the form of a tubular-shaped reflector having a reflective inner surface 20A. This reflector is further able to focus the radiation outcoupled out of the module. FIG. 3 also shows that a large fraction of the radiation 3A, 3B outcoupled out of the cavity 10 is focused in a focal point 30A. Therefore the outlet 15 is preferably arranged in such a way relative to the focal point that most of the light can be outcoupled. The reflective mirror surface 5A of the first optical element 5 can optionally additionally comprise diffusive material 40 which can also be present in the multiple reflection surface 5B of the substrate 12. As mentioned above such a diffusive material can enhance the mixing of the radiation of different radiation sources and in case that a phosphor substrate is also present can enhance the light extraction of the radiation of different radiation sources. The optoelectronic devices 2A and 2B emit visible radiation of a different wavelength so that the mixing results in a color mixing. FIG. 4 shows another embodiment of an optoelectronic module 1 according to the invention. In contrast to the embodiment shown in FIG. 3, only two first optoelectronic devices 2A, both emitting visible radiation at the same wavelength, but no second optoelectronic devices are present in the cavity 10. The parabolic mirror with the reflecting surface 5A of the first optical element 5 also comprises a radiation conversion material 5C able to emit radiation at a longer wavelength than the wavelength of the optoelectronic devices 2A when stimulated by the radiation of the optoelectronic devices. As mentioned above such a configuration can, for example, be used in order to produce white light output in the case that the first optoelectronic devices 2A emit blue light and the radiation conversion material 5C emits yellow light when absorbing the blue light.

It is also possible that the parabolic mirror-shaped housing of the first optical element 5 also comprises phosphors on its reflecting surface 5A able to convert invisible UV parts of the radiation emitted by the optoelectronic devices 2A to visible radiation thereby improving the overall light output of the optoelectronic module 1.

FIGS. 5 and 6 show different embodiments of the invention where the optoelectronic module is integrated into a larger surface including driver circuits 50 for controlling the module.

FIG. 7 shows a perspective view of an optoelectronic module according to the invention.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

REFERENCE NUMERALS

1 optoelectronic module
2A, 2B, 2C radiation sources
4 radiation output surface
5 first optical element
5A reflecting surface
5B multiple reflection area
10 cavity
11 substrate
12A surface of substrate
15 outlet (opening)
20 second optical element
30A vertex of parabolic mirror
30B focal point of parabolic mirror
40 diffusive material
50 driver circuit

The invention claimed is:

1. Optoelectronic module comprising:

at least a first and a second radiation emitting source, a first optical element including a cavity, the surface of the cavity able to reflect the radiation of the at least two radiation sources, and an outlet in the first optical element for coupling radiation out of the cavity, a second optical element arranged outside the cavity encircling the outlet, wherein the radiation emitted by the radiation sources is reflected by the surface of the cavity and the reflected radiation is out-coupled through the outlet, resulting in a mixing of the radiation from the first and second radiation emitting source, wherein the second optical element comprises a reflector.

2. The module according to claim 1, wherein the first radiation emitting source is able to emit radiation at a wavelength different to the wavelength of the second radiation emitting source.

3. The module according to claim 1, wherein the first and second radiation sources are a first and second optoelectronic device.

4. The module according to claim 1, wherein the first radiation source is an optoelectronic device and the second radiation source is a radiation conversion material.

5. The module according to claim 4, wherein said radiation conversion material is included in the surface of the cavity.

6. Module according to claim 1, further comprising a third radiation source arranged within the cavity able to emit radiation at a wavelength different to the wavelength of the first and second optoelectronic devices.

7. Module according to claim 1, wherein the first, second and third radiation sources are able to emit primary colors.

8. The module according to claim 1, wherein the radiation sources are arranged within the cavity.

9. Module according to claim 1, wherein the second optical element comprises a lens.

10. The module according to claim 1, wherein the first optical element is opaque for the radiation of the radiation sources.

11. The module according to claim 1, wherein optoelectronic devices as radiation sources are arranged within the cavity around the outlet.

12. The module according to claim 1, wherein the first optical element comprises a housing including the cavity with a concave curved surface.

13. The module according to claim 12, wherein the surface of the cavity is parabolic, spherical, hemispherical or ellipsoidal.

14. The module according to claim 1, wherein at least parts of the surface are able to reflect the radiation of the radiation sources at least two-times forming a multiple-reflection surface.

15. The module according to claim 1, wherein the first optical element further comprises a substrate having an opening as the outlet.

16. The module according to claim 15, wherein the radiation sources are arranged on the substrate around the opening.

17. The module according to claim 15, wherein the substrate is mounted on the cavity of the first optical element thereby forming a closed cavity.

18. Module according to claim 1, wherein the radiation sources comprise radiation output surfaces defining a main direction for emitting the radiation, the cavity has a concave curved surface with a vertex, the radiation output surfaces of the radiation sources are orientated towards the vertex.

19. Module according to claim 18, wherein the optoelectronic devices are arranged on the surface of a substrate with an opening as the outlet, the surface of the substrate is tilted by roughly 30° towards the opening.

20. The module according to claim 15, wherein the surface of the substrate is at least partly reflective for the radiation emitted by the radiation sources.

21. The module according to claim 20, wherein the substrate is directly mounted on the cavity of the first optical element thereby forming a closed cavity, optoelectronic devices as radiation sources are arranged around the opening of the substrate on the substrate, a large part of the surface area of the substrate inside the closed cavity being adjacent to the housing is free of the optoelectronic devices.

22. The module according to claim 15, wherein the substrate is flat.

23. Module according to claim 15 further comprising electronic components for controlling the current of the optoelectronic devices, the electronic components are arranged on the surface of the substrate remote to the optoelectronic devices.

24. Module according to claim 15, wherein the substrate is also a driver circuit board.

25. Module according to claim 1, further comprising electronic components for controlling the current of the optoelectronic devices.

26. The module according to claim 1, wherein the surface of the cavity also comprises a diffusive material.

27. The module according to claim 1, wherein the reflecting surface of the cavity comprises a material selected from the group of $BaSO_4$ and phosphorus.

28. The module according to claim 1, wherein the reflecting surface of the cavity comprises a faceted surface.

29. The module according to claim 1, wherein the surface of the cavity forms a concave mirror able to focus the radiation of the optoelectronic devices in a focal point, wherein the outlet is arranged in or near the focal point.

30. The module according to claim 1, wherein the optoelectronic devices and the first optical element are thermally conductive connected.

31. The module according to claim 1, wherein the size of the outlet is adjustable.

32. A lighting device comprising:

at least one optoelectronic module according to claim 1.

* * * * *

UNITED STATES PATENT AND TRADEMARK OFFICE

CERTIFICATE OF CORRECTION

PATENT NO. : 9,042,041 B2
APPLICATION NO. : 11/798558
DATED : May 26, 2015
INVENTOR(S) : Alessandro Scordino It is certified that error appears in the above-identified patent and that said Letters Patent is hereby corrected as shown below:

In the specification,

Column 2, line 7: Please insert the words --radiation outcoupled through the outlet in a very small-- after the last word of line "mixed" and the first word of line 8 "radiation".

Signed and Sealed this
Eighth Day of March, 2016

Michelle K. Lee
*Director of the United States Patent and Trademark Office*